United States Patent
Jung

(10) Patent No.: US 8,897,416 B2
(45) Date of Patent: Nov. 25, 2014

(54) X-RAY DETECTOR, METHOD OF CONTROLLING THE SAME, AND X-RAY PHOTOGRAPHING SYSTEM

(75) Inventor: Kwan-Wook Jung, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 680 days.

(21) Appl. No.: 13/155,934

(22) Filed: Jun. 8, 2011

(65) Prior Publication Data

US 2012/0106700 A1    May 3, 2012

(30) Foreign Application Priority Data

Oct. 28, 2010  (KR) .......................... 10-2010-0106019

(51) Int. Cl.
*G01N 23/04* (2006.01)
*G01T 1/20* (2006.01)
*G03B 42/02* (2006.01)

(52) U.S. Cl.
CPC .............. *G01T 1/2018* (2013.01); *G03B 42/02* (2013.01)
USPC ............................................ 378/62; 378/98.8

(58) Field of Classification Search
USPC .................................. 378/98.8, 115, 116, 117
See application file for complete search history.

(56) References Cited

U.S. PATENT DOCUMENTS

2010/0020933 A1*  1/2010  Topfer et al. ............... 378/98.11
2010/0166143 A1   7/2010  Sung et al.

FOREIGN PATENT DOCUMENTS

| JP | 2008-029393 | 2/2008 |
| JP | 2008-272132 | 11/2008 |
| KR | 10-0780848 | 11/2007 |

* cited by examiner

Primary Examiner — Hoon Song
(74) Attorney, Agent, or Firm — Robert E. Bushnell, Esq.

(57) ABSTRACT

An, X-ray detector photographs an object by receiving an X-ray irradiated from an X-ray generator. The X-ray detector includes: a plurality of photo-detecting pixels, each of which includes a photodiode, which detects an X-ray and generates an electric signal corresponding to an amount of a transmitted X-ray, and a switching device which transmits the electric signal; a gate driver which supplies a gate pulse to the switching device for turning on the switching device; and a read-out integrated circuit (IC) which reads out the electric signals from the plurality of photo-detecting pixels; wherein the gate driver and the read-out IC initialize the plurality of photo-detecting pixels in response to an X-ray warm-up control signal causing warm up of the X-ray generator.

11 Claims, 6 Drawing Sheets

X-RAY DETECTOR, METHOD OF CONTROLLING THE SAME, AND X-RAY PHOTOGRAPHING SYSTEM

CLAIM OF PRIORITY

This application makes reference to, incorporates the same herein, and claims all benefits accruing under 35 U.S.C. §119 from an application earlier filed in the Korean Intellectual Property Office on Oct. 28, 2010 and there duly assigned Ser. No. 10-2010-0106019.

BACKGROUND OF THE INVENTION

1. Field of the Invention

The present invention relates to an X-ray detector, a method of controlling the same, and an X-ray photographing system.

2. Description of the Related Art

X-rays may be easily transmitted through an object due to their short wavelength, and the amount of a transmitted X-ray depends on the internal density of the object. In other words, the interior of the object may be indirectly observed based on an amount of X-ray transmitted through the object.

An X-ray detector is a device for detecting an amount of an X-ray transmitted through an object. The X-ray detector detects the amount of the X-ray and displays the interior of the object on a display device. The X-ray detector may be generally used as a medical testing device and a non-destructive testing device.

Currently, flat panel digital radiography (referred to hereinafter as "DR") devices, which employ a DR method requiring no film, are generally used.

A flat panel X-ray detector using the method as stated above acquires an image based on electric signals corresponding to incident radiation. The acquired image may differ from an actual image corresponding to the acquired image due to different device offset values of the X-ray detector, where the device offset values are continuously changed according to surrounding environments. Therefore, it is necessary to initialize an X-ray detector before an X-ray photographing operation is carried out.

SUMMARY OF THE INVENTION

The present invention generally relates to reducing the delay of initializing an X-ray detector during an X-ray photographing operation.

According to an aspect of the present invention, there is provided an X-ray detector which photographs an object by receiving an X-ray irradiated from an X-ray generator, including: a plurality of photo-detecting pixels, each of which includes a photodiode which detects an X-ray and generates an electric signal corresponding to an amount of a transmitted X-ray, and a switching device which transmits the electric signal; a gate driver which supplies, to the switching device, a gate pulse for turning on the switching device; and a read-out integrated circuit (IC) which reads out the electric signals from the plurality of photo-detecting pixels; wherein the gate driver and the read-out IC initialize the plurality of photo-detecting pixels in response to an X-ray warm-up control signal causing a warm up of the X-ray generator.

The gate driver and the read-out IC initialize the plurality of photo-detecting pixels by reading out the plurality of photo-detecting pixels at least twice.

The gate driver may output the gate pulse to the plurality of photo-detecting pixels at least twice in response to the X-ray warm-up control signal, and the read-out IC may read out the plurality of photo-detecting pixels in response to the X-ray warm-up control signal.

The read-out IC may discharge the read-out signal in response to the X-ray warm-up control signal.

The X-ray detector may operate in an X-ray exposure mode, in which the plurality of photo-detecting pixels generate the electric signals in response to an exposure preparation signal input from the X-ray generator and, after the X-ray exposure is complete, the X-ray detector may operate in an X-ray read-out mode for reading out the electric signals from the plurality of photo-detecting pixels.

According to another aspect of the present invention, there is provided an X-ray photographing system including: an X-ray generator which is warmed up in response to an X-ray warm-up control signal, and which irradiates an X-ray in response to a photographing control signal; and an X-ray detector which photographs an object by receiving the X-ray irradiated from the X-ray generator; wherein the X-ray detector is initialized in response to the X-ray warm-up control signal.

According to another aspect of the present invention, there is provided a method of driving an X-ray detector which photographs an object by receiving an X-ray irradiated from an X-ray generator, the method including the steps of: initializing the X-ray generator in response to an X-ray warm-up control signal causing warm up of the X-ray generator; photographing an object in response to an exposure preparation signal causing preparation of the X-ray detector for exposure; and reading out signals detected by each of a plurality of photo-detecting pixels after the X-ray exposure is complete.

The operation of initializing the X-ray generator may include initializing the plurality of photo-detecting pixels by reading out the plurality of photo-detecting pixels at least twice.

The operation of initializing the X-ray generator may further include reading out the plurality of photo-detecting pixels by outputting gate pulses for turning on switching devices connected to the plurality of photo-detecting pixels at least twice.

The operation of initializing the X-ray generator may further include discharging the read-out signal in response to the X-ray warm-up control signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will now be described more fully with reference to the accompanying drawings, in which exemplary embodiments of the invention are shown. In the description of the present invention, the detailed description of technical features that may be embodied by one of ordinary skill in the art without undue difficulty may be omitted.

Furthermore, the present invention shall not be limited by the present specification and drawings attached thereto, and the scope of the present invention shall be determined based on the scope of claims. The terms used herein must be interpreted based on the contents of the entire specification.

Figure 1:
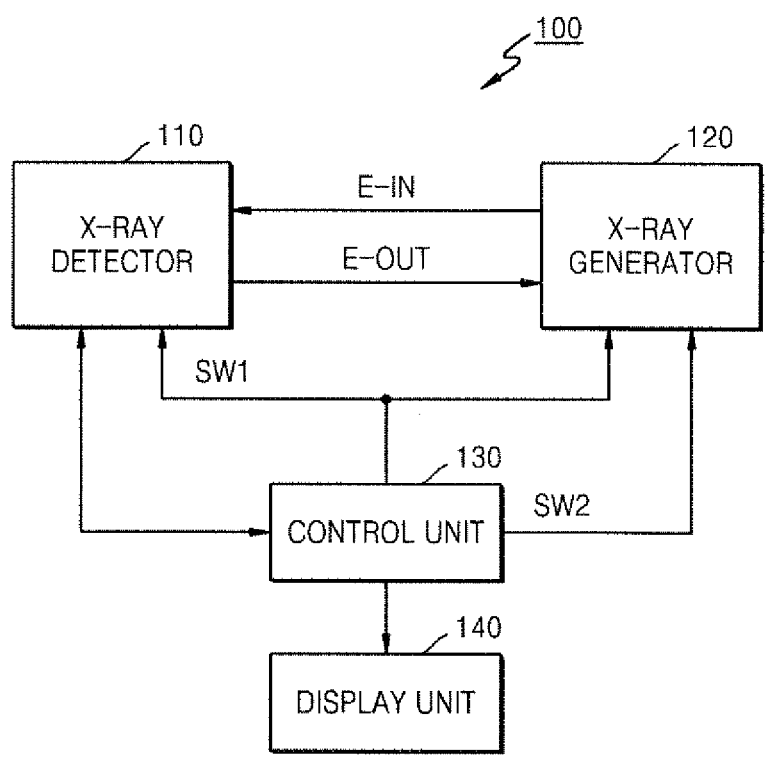
FIG. 1 is a diagram showing the structure of an X-ray photographing system according to an embodiment of the present invention.

FIG. 1 is a diagram showing the structure of an X-ray photographing system according to an embodiment of the present invention.

The X-ray photographing system 100 according to the present embodiment includes an X-ray detector 110, an X-ray generator 120, a control unit 130, and a display unit 140.

In the X-ray photographing system 100, the X-ray generator 120 is warmed up in response to an X-ray warm-up control signal SW1 inputted by the control unit 130, and X-ray photographing system 100 performs an X-ray photographing operation by instructing the X-ray generator 120 to irradiate an X-ray onto an object and the X-ray detector 110 in response to a photographing control signal SW2. In detail, after the X-ray warm-up signal SW1 is inputted and the X-ray generator 120 is warmed up, the X-ray generator 120 outputs an exposure preparation signal E-IN to the X-ray detector 110. In response to the exposure preparation signal E-IN, the X-ray detector 110 outputs an exposure ready signal E-OUT to the X-ray generator 120 when the X-ray detector 110 is ready to photograph an object. The X-ray generator 120 irradiates an X-ray onto the object and the X-ray detector 110 in response to the exposure ready signal E-OUT.

When an X-ray, which is transmitted through an object, is incident on the X-ray detector 110, the X-ray is converted to a light of a green wavelength band as the X-ray is transmitted through a scintillator, and a photo-diode of the panel of the X-ray detector 110 converts incident optical signals to electric signals. A read-out integrated circuit (IC) reads the electric signals and transmits the read electric signals to a predetermined signal processing unit. The signal processing unit digitizes the electric signals and displays the electric signals as an image.

The X-ray detector 110 may, for example, be an electroluminescence (EL) sheet. However, in this case, some problems may occur in acquiring a stable image of an object. First, the X-ray detector 110 may not deal with offset changes due to temperature changes, and thus it is difficult to deal with an increase in noise and offset changes due to temperature changes. Furthermore, an X-ray photographing operation is not performed periodically. Therefore, intervals of acquiring X-ray images are irregular, and noise increases in X-ray images.

To resolve such problems, a method of continuously acquiring offset images when an X-ray photographing operation is not performed and/or a method of initializing a photodiode and a data line by performing a gate scanning mode, which is an operation for repeatedly reading out photo-detecting pixels of the X-ray detector 110 just before an X-ray photographing operation, may be used. In embodiments of the present invention, an X-ray warm-up control signal SW1 is inputted not only to the X-ray generator 120 but also to the X-ray detector 110, and the X-ray detector 110 performs initialization in response to the X-ray warm-up control signal SW1 so that no delay occurs due to initialization of the X-ray detector 110 during an X-ray photographing operation.

The X-ray detector 110 includes a plurality of photo-detecting pixels in a flat panel for detecting an X-ray. Each of the photo-detecting pixels includes a plurality of photodiodes, which are capable of detecting the amount of an X-ray transmitted through an object, and a plurality of switching devices. When a reverse bias is applied to a photodiode and an X-ray is applied to the photodiode, an electric signal corresponding to the amount of the transmitted X-ray is generated by the photodiode. Such an electric signal is inputted to a read-out IC via a switching device and a data line.

When no X-ray is irradiated, the X-ray detector 110 may be in an idle state or may perform offset read-out for acquiring an offset image. When an X-ray is irradiated, the photodiode, to which a reverse bias is applied, generates an electric signal corresponding to the amount of the transmitted X-ray, and the X-ray detector 110 may read out the electric signal and display an X-ray image.

The X-ray detector 110 according to embodiments of the present invention initializes a photodiode and a data line by operating in a gate scanning mode, which is an operation mode for repeatedly reading out photo-detecting pixels at least twice, in response to an X-ray warm-up control signal SW1. Therefore, the X-ray detector 110 completes the gate scanning mode when then X-ray generator 120 is warmed up, and thus an object may be photographed without a delay due to initialization of the X-ray detector 110 after a photographing control signal SW2 is inputted.

The X-ray generator 120 includes an X-ray tube which generates an X-ray therein, and a collimator for limiting an X-ray irradiated region. The X-ray generator 120 generates an X-ray, and radiates the X-ray. The X-ray generator 120 warms up the X-ray tube in response to an X-ray warm-up control signal SW1, exchanges an exposure preparation signal E-IN and an exposure ready signal E-OUT with the X-ray detector 110, and irradiates an X-ray onto the X-ray detector 110.

The control unit 130 is a device having a user interface, such as a personal computer, a workstation or the like, outputs an X-ray warm-up control signal SW1 to the X-ray detector 110 and the X-ray generator 120 automatically or according to a user input, and outputs a photographing control signal SW2 to the X-ray generator 120. Furthermore, the control unit 130 displays an image of an object on the display unit 140 by outputting a signal output by means of the X-ray detector to the display unit 140.

Analog-to-digital conversion and image processes with respect to a signal detected by the X-ray detector 110 may be performed by either a signal processor (not shown) integrated in the X-ray detector 110 or by the control unit 130.

The display unit 140 displays an image of an object and may be embodied by using any of various display devices, such as a liquid crystal display (LCD) device, an organic electroluminescent display device, or by the like.

Figure 2:
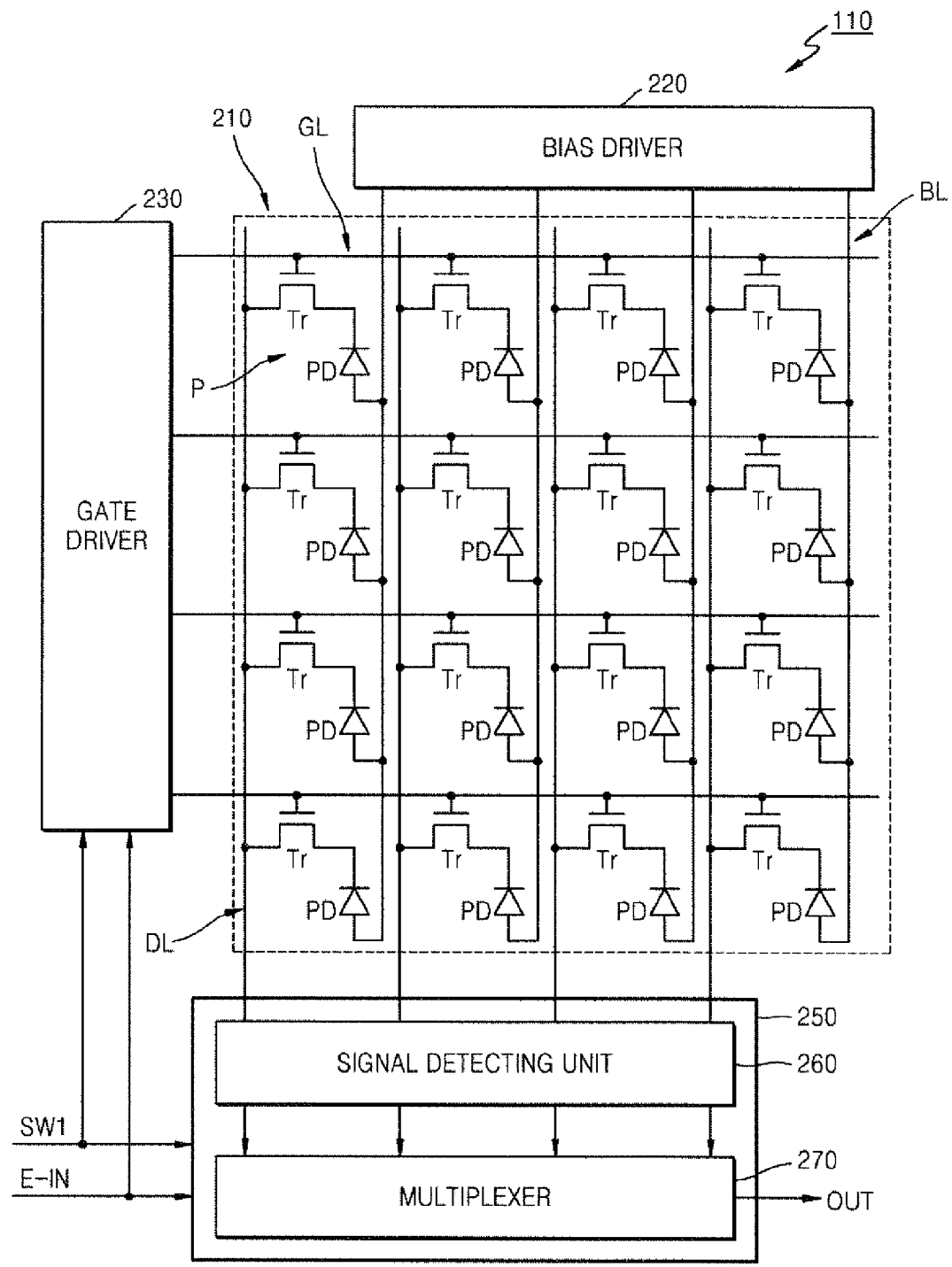
FIG. 2 is a diagram showing the structure of an X-ray detector according to an embodiment of the present invention.
Figure 3:
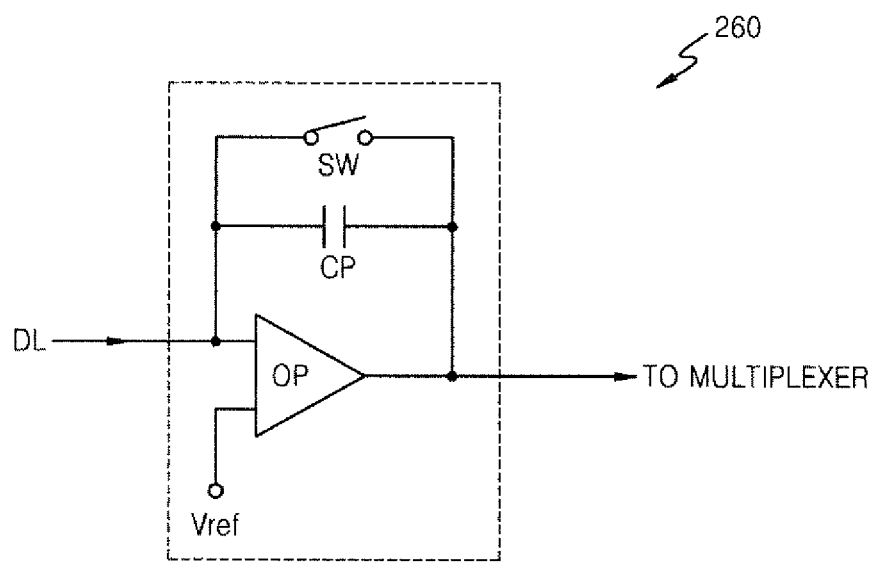
FIG. 3 is a diagram showing the configuration of a signal detecting unit shown in FIG. 2.

FIG. 2 is a diagram showing the structure of an X-ray detector according to an embodiment of the present invention, and FIG. 3 is a diagram showing the configuration of a signal detecting unit shown in FIG. 2.

The X-ray detector 110 includes a pixel unit 210, a bias driver 120, a gate driver 230, and a read-out IC 250.

The pixel unit 210 detects an X-ray radiated by the X-ray generator 120, photoelectrically converting the detected X-ray into electric signals, and outputs the electric signals. The pixel unit 210 includes a plurality of photo-detecting pixels P which are arranged in a matrix at locations close to points where a plurality of gate lines GL and a plurality of data lines DL cross each other. The plurality of gate lines GL and the plurality of data lines DL may be arranged to cross each other perpendicularly or substantially perpendicular. Although FIG. 2 shows 16 photo-detecting pixels P arranged in 4 rows and 4 columns, the present invention is not limited thereto, and the number of photo-detecting pixels P may vary.

Each of the photo-detecting pixels P includes a photodiode PD which detects an X-ray and outputs an electric signal (e.g., photo detect signal), and a switching device Tr which transmits the electric signal outputted by the photodiode PD in response to a gate pulse. The switching device Tr may, for example, be a transistor. The following descriptions will focus on an embodiment in which the switching device Tr is a transistor.

The photodiode PD detects an X-ray radiated by the X-ray generator 120 and outputs detected signals as electric signals. The photodiode PD is a device for photoelectrically converting incident light to electric signals, e.g., a PIN diode. A first photodiode PD is electrically connected to a first electrode of the transistor Tr, whereas a second electrode of the photodiode PD is electrically connected to a bias line BL, via which a bias is applied.

The transistor Tr is a switching device for transmitting an electric signal outputted by the photodiode PD. A gate electrode of the transistor Tr is electrically connected to a gate line GL, whereas a second electrode of the transistor Tr is electrically connected to the read-out IC 250.

The bias driver 220 applies driving voltages to bias lines BL. The bias driver 220 may selectively apply a reverse bias or a forward bias to the photodiode PD.

The gate driver 230 sequentially applies gate pulses at a gate-on voltage level to the plurality of gate lines GL. The transistors Tr of the photo-detecting pixels P are turned on in response to the gate pulses.

When the transistor Tr is turned on, an electric signal outputted by the photodiode PD is inputted to the read-out IC 250 via the transistor Tr and the data line DL. The gate driver 230 may be formed as an IC, and may be attached to a side of the pixel unit 210 or it may be formed on the same substrate as the pixel unit 210.

The read-out IC 250 reads out the electric signal outputted by the transistor Tr which is turned on in response to the gate pulse. The read-out IC 250 reads out detected signals outputted by the photo-detecting pixel P during an offset read-out period for reading out an offset image and an X-ray read-out period for reading out signals detected after X-ray exposure.

The read-out IC 250 may include the signal detecting unit 260 and a multiplexer 270.

The signal detecting unit 260 includes a plurality of amplifying units respectively corresponding to the plurality of data lines DL, and each of the amplifying units includes an amplifier OP, a capacitor CP, and a reset device SW.

Referring to FIG. 3, the amplifier OP includes a first input connected to the data line DL, a second input via which a reference voltage Vref is applied, and an output. The reference voltage Vref may be a ground voltage. The first input may be an inverting input of the amplifier OP, whereas the second input may be a non-inverting input of the amplifier OP. A signal outputted by the output of the amplifier OP is inputted to the multiplexer 270.

A first terminal of the capacitor CP is electrically connected to the first input of the amplifier OP, whereas a second terminal of the capacitor CP is electrically connected to the output of the amplifier OP.

The reset device SW resets the capacitor CP by discharging a voltage charged to the capacitor CP. The reset device SW is connected in parallel with the capacitor CP, where a first end of the reset device SW is electrically connected to the first terminal of the capacitor CP, and the second terminal of the reset device SW is electrically connected to the second terminal of the capacitor CP. The reset device SW may include a switch for electrically connecting both terminals of the capacitor CP. When the switch is closed, both terminals of the capacitor CP are electrically connected to each other, and voltages charged to the capacitor CP are discharged. The switch of the reset device SW is closed during a gate scanning mode so as to discharge the data line DL.

The multiplexer 270 receives voltage signals from the amplifier OP of the signal detecting unit 260 and sequentially outputs the received voltage signals to the unit 130 or a predetermined signal processing unit. The multiplexer 260 may include a plurality of switches respectively corresponding to the amplifiers OP.

Figure 4:
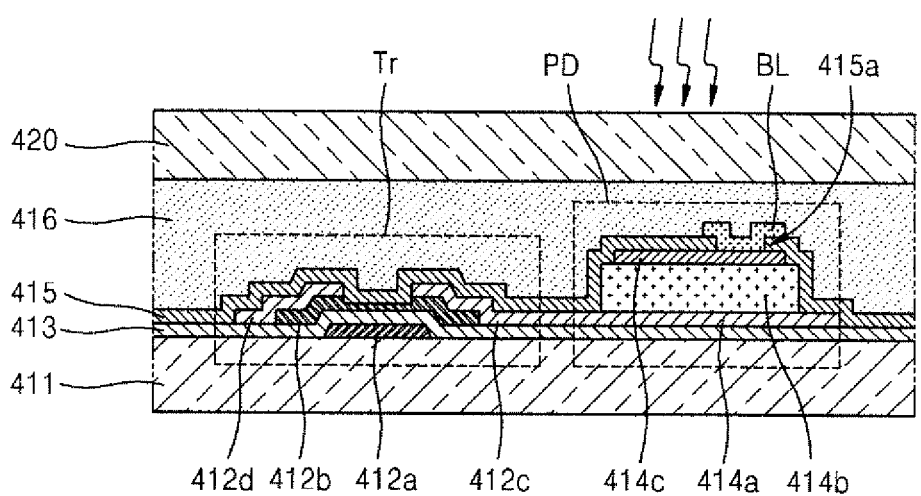
FIG. 4 is a sectional view of the photo-detecting pixel unit shown in FIG. 2.

FIG. 4 is a sectional view of the photo-detecting pixel P unit shown in FIG. 2.

Referring to FIG. 4, the photo-detecting pixel P unit includes the transistor Tr and the photodiode PD, which are formed on a base substrate 411. The transistor Tr may include a gate electrode 412a, an active pattern 412b, a first electrode 412c, and a second electrode 412d. The photodiode PD may include a first electrode 414a, a photoconductive layer 414b, and a second electrode 414c.

The base substrate 411 may have a plate-like shape. The base substrate 411 may be formed of a transparent material, e.g., glass, quartz, or synthetic resin.

The gate electrode 412a of the transistor Tr is formed on the base substrate 411. The gate electrode 412a may be formed to protrude from the gate line GL and may be formed of the same material as the gate line L, e.g., aluminum (Al) or an aluminum alloy.

The gate electrode 412a is covered by a gate insulation layer 413. The gate insulation layer 413 may be formed of silicon nitride $SiN_x$ and/or silicon oxide $SiO_x$, for example.

The active pattern 412b of the transistor Tr is formed on the gate insulation layer 413. The active pattern 412b may include a channel layer formed on the gate insulation layer 413 and an ohmic contact layer formed on the channel layer, for example. The channel layer may include amorphous silicon (a-Si), whereas the ohmic contact layer may include densely ion-doped a-Si (n+a-Si or p+a-Si).

The first electrode 412c and the second electrode 412d of the transistor Tr are formed on the active pattern 412b so as to be a predetermined distance apart from each other. The first electrode 412c and the second electrode 412d may be formed of a same material as the data line DL, e.g., molybdenum (Mo), molybdenum-tungsten (MoW) alloy, chrome (Cr), tantalum (Ta), or titanium (Ti).

The first electrode 414a of the photodiode PD is formed on the gate insulation layer 413 in integration with the first electrode 412c of the transistor Tr, so that the first electrode 414a of the photodiode PD and the first electrode 412c of the transistor Tr are electrically connected to each other.

The photoconductive layer 414b is formed on the first electrode 414a of the photodiode PD. Although not shown, the photoconductive layer 414b may have a structure in which a n-type silicon layer, an intrinsic silicon layer, and a p-type silicon layer are stacked in the order stated.

The second electrode 414c of the photodiode PD is formed on the photoconductive layer 414b so as to face the first electrode 414a of the photodiode PD. The second electrode 414c of the photodiode PD may contain a transparent conductive material, e.g., indium tin oxide (ITO), such that an X-ray may be applied to the photoconductive layer 414b.

A protective layer 415 covering the photodiode PD and the transistor Tr is formed on the front surface of the base substrate 411. The protective layer 415 may be formed of silicon nitride $SiN_x$ and/or silicon oxide $SiO_x$, for example.

A contact hole 415a for exposing the second electrode 414c of the photodiode PD is formed in the protective layer 415. The bias line BL may be electrically connected to the second electrode 414c of the photodiode PD via the contact hole 415a.

An insulation layer 416, covering the protective layer 415 and the bias line BL, may be formed on the front surface of the base substrate 411.

A scintillator 420 is formed on the top surface of the pixel unit 210, that is, on the insulation layer 416. The scintillator 420 converts an X-ray, which is incident through an object from the X-ray generator 120, to a visible green light having a wavelength of about 550 nm and transmits the green light to the pixel unit 210. The scintillator 420 may be formed of cesium iodide, for example.

Figure 5:
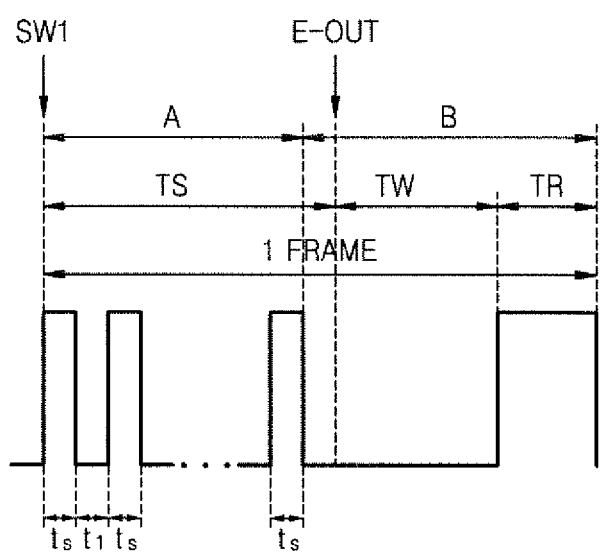
FIG. 5 is a timing diagram showing an X-ray photographing operation according to an embodiment of the present invention.

FIG. 5 is a timing diagram showing an X-ray photographing operation according to an embodiment of the present invention.

An X-ray photographing operation according to embodiments of the present invention is initiated in response to an X-ray warm-up control signal SW1. An operation cycle for acquiring a frame of an X-ray image includes a signal initialization period A and an X-ray read-out period B.

In the signal initialization period A, the X-ray detector 110 performs gate scanning at least twice. A gate scanning time ts is a period of time during which a gate scanning is performed by sequentially applying gate pulses from the first gate line to the final gate line. A gate scanning interval ti may even be set to 0. Gate scanning is performed for a plurality of times during the gate scanning time ts. According to embodiments of the present invention, the X-ray detector 110 performs the gate scanning mode while the X-ray generator 120 is being warmed up, and thus a delay due to the gate scanning mode may be eliminated.

In detail, during the signal initialization period A, the gate driver 230 sequentially applies gate pulses to the plurality of gate lines GL, and the transistors Tr of each of the rows are sequentially turned on by the gate pulses. At this point, the reset device SW of the signal detecting unit 260 is closed to initialize the capacitor CP by electrically shorting both terminals of the capacitor CP. Furthermore, the data line DL is discharged as the reset device SW is closed. After the gate scanning mode is complete, the reset device SW is opened again.

After the gate scanning mode is complete, the X-ray read-out period B is initiated. When the X-ray read-out period B is initiated, the X-ray detector 110 stands by until an exposure preparation signal E-IN is inputted from the X-ray generator 120. When the exposure preparation signal E-In is inputted from the X-ray generator 120, the X-ray detector 110 outputs an exposure ready signal E-OUT to the X-ray generator 120 and is exposed to an X-ray during an X-ray window time TW. Here, the transistor Tr is turned off.

According to an embodiment, the gate scanning mode may be performed longer than the warm-up of the X-ray generator 120. In this case, an exposure preparation signal E-IN may be inputted from the X-ray generator 120 before the gate scanning mode is complete. If an exposure preparation signal E-IN may be input to the X-ray detector 110 from the X-ray generator 120 before the gate scanning mode is complete, the X-ray detector 110 outputs an exposure ready signal E-OUT to the X-ray generator 120 after the gate scanning mode is complete.

When the X-ray window time TW is over, the X-ray detector 110 performs an X-ray read-out, which is an operation for decoding signals detected by each of the photo-detecting pixels P.

In detail, the gate driver 230 sequentially applies gate pulses to the plurality of gate lines GL. The transistors Tr of each of the rows are sequentially turned on by the gate pulses. During the X-ray window time TR, electric signals formed in the photodiode PD are read out via the turned on transistors Tr and the data lines DL, and are transmitted to the read-out IC 250.

Figure 6:
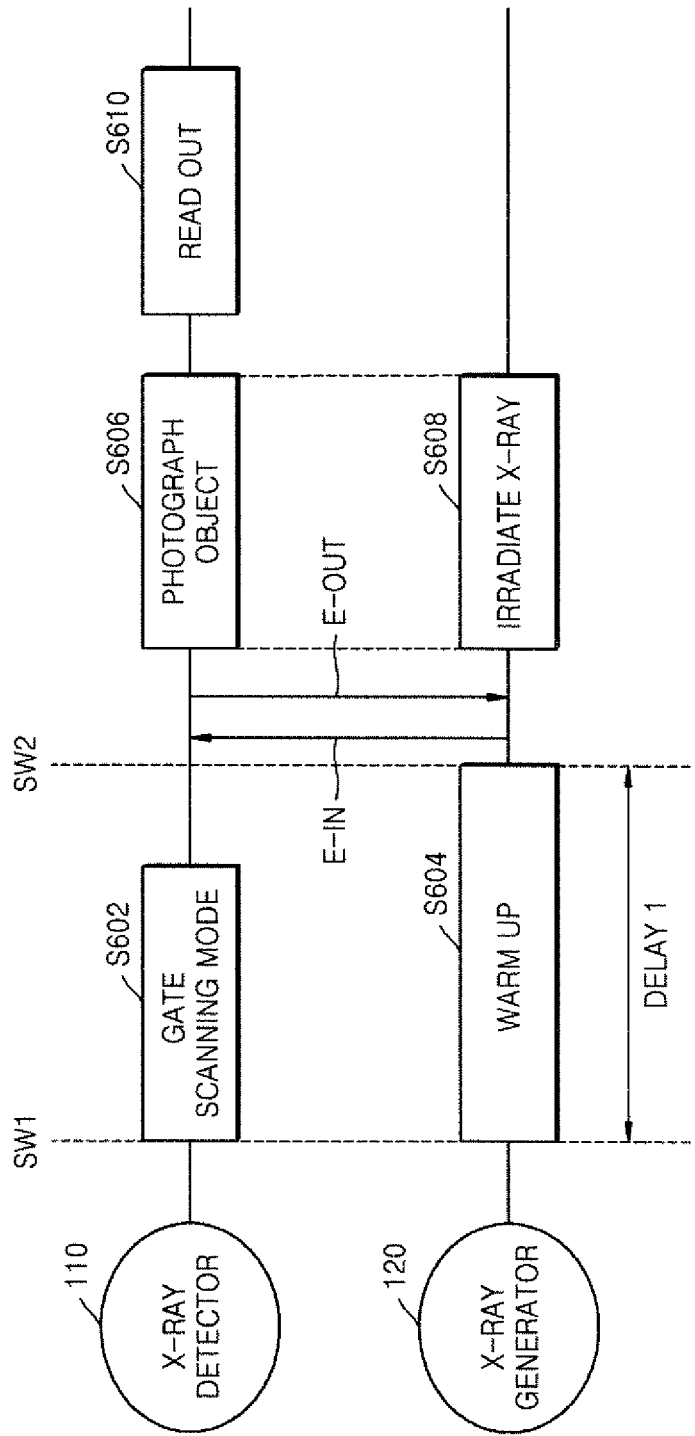
FIG. 6 is a diagram showing a method of operating an X-ray detector according to an embodiment of the present invention.
Figure 7:
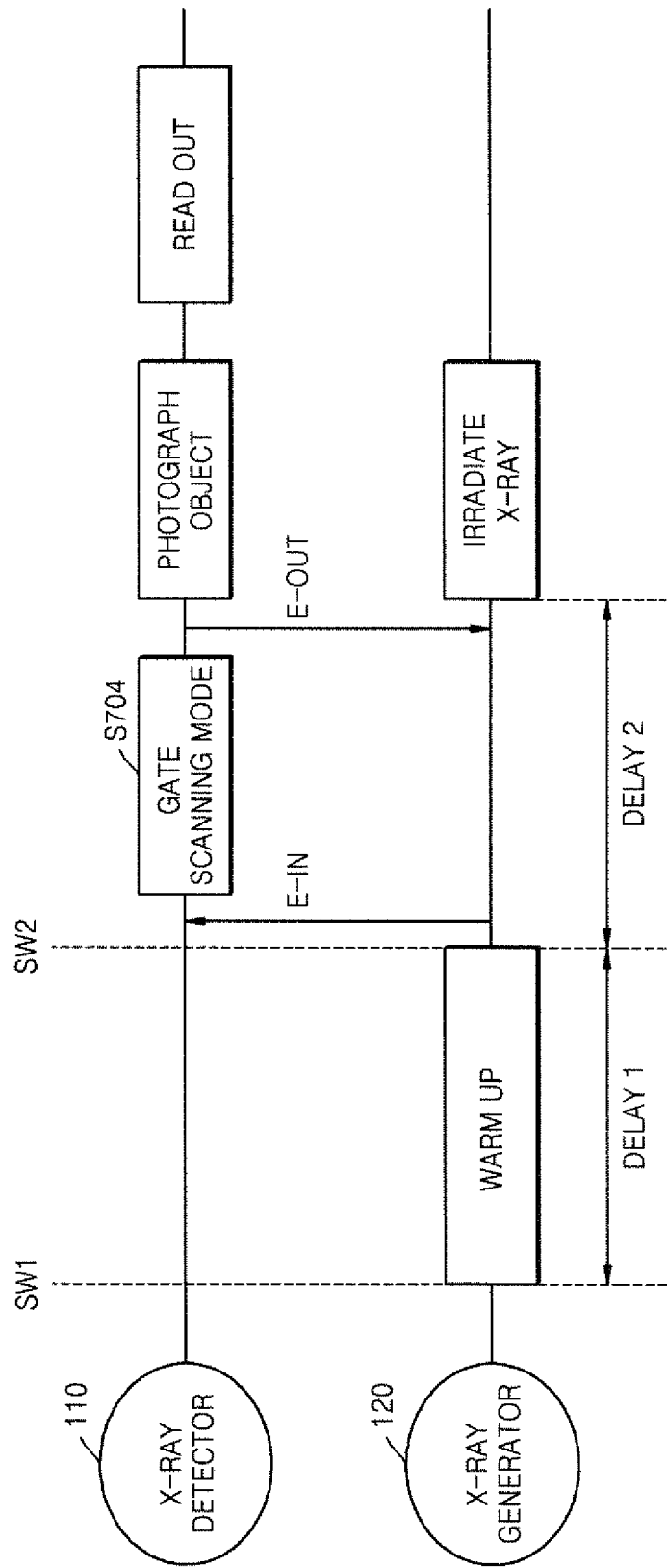
FIG. 7 is a diagram showing a method of operating an X-ray detector according to a comparative embodiment.

FIG. 6 is a diagram showing a method of operating an X-ray detector according to an embodiment of the present invention, and FIG. 7 is a diagram showing a method of operating an X-ray detector according to a comparative embodiment. The method of operating an X-ray detector according to the present invention and the effects of embodiments of the present invention will be described below with reference to FIGS. 6 and 7. First, referring to FIG. 6, the method of operating an X-ray detector according to the embodiment of the present invention will be described.

According to an embodiment of the present invention, in response to an X-ray warm-up control signal SW1, the X-ray detector 110 initiates a gate scanning mode (operation S602), and the X-ray generator 120 initiates a warm-up of an X-ray tube (an operation S604). Therefore, initialization of the X-ray detector 110 and warm-up of the X-ray generator 120 are performed at the same time. If a photographing control signal SW2 is inputted from the control unit 130 at a point in time after the warm-up of the X-ray generator 120 is complete, the X-ray generator 120 outputs an exposure preparation signal E-In to the X-ray detector 110, and, if the gate scanning mode (the operation 5602) is complete, the X-ray detector 110 outputs an exposure ready signal E-OUT to the X-ray generator 120 when all of the transistors Tr of the photo-detecting pixels P are turned off. In response to the exposure ready signal E-OUT, the X-ray generator 120 irradiates an X-ray to an object and the X-ray detector 110 (operation S608), and, in response to the X-ray transmitted through the object, the X-ray detector 110 generates electric signals in the photodiodes PD and photographs the object (operation S606) when the transistors Tr are turned off. After the X-ray irradiation is over, the X-ray detector 110 performs an X-ray read-out for decoding signals detected by each of the photo-detecting pixels P by sequentially applying gate pulses to the photo-detecting pixels P in each of the columns.

Hereinafter, effects of the present invention will be described with reference to FIG. 7.

In the method of operating an X-ray detector according to the comparative embodiment as shown in FIG. 7, the X-ray detector 110 initiates a gate scanning mode in response to an exposure preparation signal E-IN generated after a photographing control signal SW2 (operation S704) instead of initiating a gate scanning mode in response to an X-ray warm-up control signal SW1. In the case of operating an X-ray detector according to the comparative embodiment as shown in FIG. 7, a delay DELAY2 due to the gate scanning mode occurs after the photographing control signal SW2 is input. However, in the case of operating an X-ray detector according to an embodiment of the present invention as shown in FIG. 6, the delay DELAY2 due to the gate scanning mode may be eliminated.

According to embodiments of the present invention, delay due to initializing of an X-ray detector during an X-ray photographing operation may be reduced.

While this invention has been particularly shown and described with reference to embodiments thereof, it will be understood by those skilled in the art that various changes in form and detail may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An X-ray detector for photographing an object by receiving an X-ray irradiated from an X-ray generator, comprising:
    a plurality of photo-detecting pixels, each of which comprises a photodiode which detects an X-ray and generates data signal corresponding to an amount of a transmitted X-ray, and a switching device which transmits the data signal;
    a gate driver controlling the switching device by generating a gate pulse; and
    a read-out integrated circuit (IC) which reads out the data signals from the plurality of photo-detecting pixels;
    wherein the gate driver and the read-out IC initialize the plurality of photo-detecting pixels in response to an X-ray warm-up control signal causing warming up of the X-ray generator,
    the gate driver and the read-out IC initialize the plurality of photo-detecting pixels by reading out the plurality of photo-detecting pixels at least twice.

2. The X-ray detector of claim 1, wherein the gate driver outputs the gate pulse to the plurality of photo-detecting pixels at least twice in response to the X-ray warm-up control signal, and the read-out IC reads out the plurality of photo-detecting pixels in response to the X-ray warm-up control signal.

3. The X-ray detector of claim 2, wherein the read-out IC discharges the read-out signal in response to the X-ray warm-up control signal.

4. The X-ray detector of claim 1, wherein the X-ray detector operates in an X-ray exposure mode, in which the plurality of photo-detecting pixels generate the data signals, in response to an exposure preparation signal inputted from the X-ray generator and, after the X-ray exposure is complete, the X-ray detector operates in an X-ray read-out mode for reading out the data signals from the plurality of photo-detecting pixels.

5. An X-ray photographing system comprising:
    an X-ray generator which is warmed up in response to an X-ray warm-up control signal, and which irradiates an X-ray in response to a photographing control signal; and
    an X-ray detector which photographs an object by receiving the X-ray irradiated from the X-ray generator;
    wherein the X-ray detector is initialized in response to the X-ray warm-up control signal,
    the X-ray detector comprises:
    a plurality of photo-detecting pixels, each of which comprises a photodiode which detects an X-ray and generates data signal corresponding to an amount of a transmitted X-ray, and a switching device which transmits the data signal;
    a gate driver which supplies a gate pulse to the switching device for turning on the switching device; and
    a read-out integrated circuit (IC) which reads out the data signals from the plurality of photo-detecting pixels;
    wherein the gate driver and the read-out IC initialize the plurality of photo-detecting pixels by reading out the plurality of photo-detecting pixels at least twice.

6. The X-ray photographing system of claim 5, wherein the gate driver outputs the gate pulse to the plurality of photo-detecting pixels at least twice in response to the X-ray warm-up control signal, and the read-out IC reads out the plurality of photo-detecting pixels in response to the X-ray warm-up control signal.

7. The X-ray photographing system of claim 6, wherein the read-out IC discharges the read-out signal in response to the X-ray warm-up control signal.

8. The X-ray photographing system of claim 5, wherein the X-ray detector operates in an X-ray exposure mode in which the plurality of photo-detecting pixels generate the data signals in response to an exposure preparation signal inputted from the X-ray generator and, after the X-ray exposure is complete, the X-ray detector operates in an X-ray read-out mode for reading out the data signals from the plurality of photo-detecting pixels.

9. A method of driving an X-ray detector which photographs an object by receiving an X-ray irradiated from an X-ray generator, the method comprising the steps of:
    initializing the X-ray generator in response to an X-ray warm-up control signal calling for warm up of the X-ray generator;
    photographing an object in response to an exposure preparation signal calling for preparation of the X-ray detector for exposure; and
    reading out signals detected by each of a plurality of photo-detecting pixels after the X-ray exposure is complete,
    wherein the step of initializing the X-ray generator comprises initializing the plurality of photo-detecting pixels by reading out the plurality of photo-detecting pixels at least twice.

10. The method of claim 9, wherein the step of initializing the X-ray generator further comprises reading out the plurality of photo-detecting pixels by outputting gate pulses for turning on switching devices to the plurality of photo-detecting pixels at least twice.

11. The method of claim 10, wherein the step of initializing the X-ray generator further comprises discharging the read-out signal in response to the X-ray warm-up control signal.

* * * * *